C. O. HASKELL.
ELECTRIC WATER HEATER.
APPLICATION FILED OCT. 31, 1908.
1,045,975.
Patented Dec. 3, 1912.
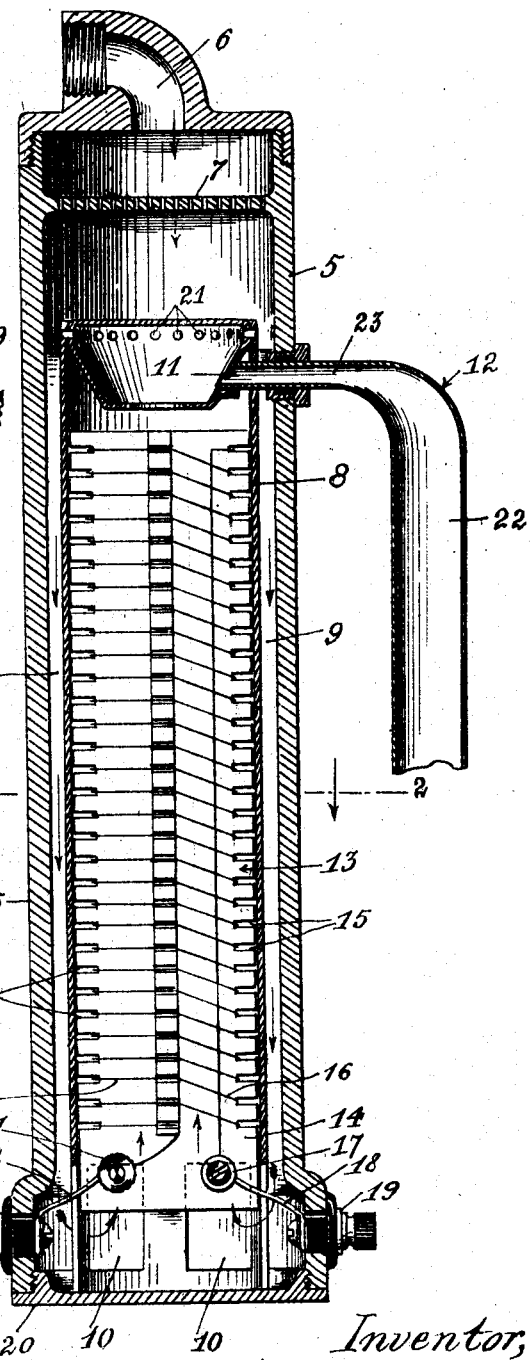
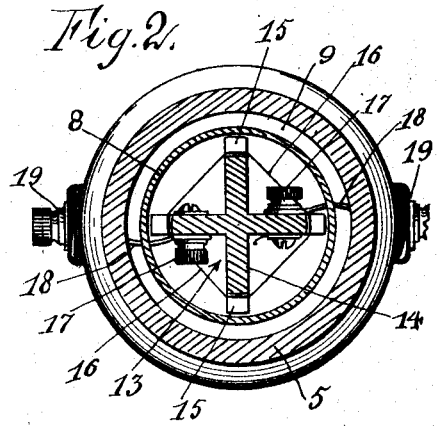
Witnesses,
Inventor,
Charles O. Haskell,
By
Attorneys.

UNITED STATES PATENT OFFICE.

CHARLES O. HASKELL, OF LOS ANGELES, CALIFORNIA, ASSIGNOR TO EDMUND A. STRAUSE, OF CHICAGO, ILLINOIS.

ELECTRIC WATER-HEATER.

1,045,975.

Specification of Letters Patent. Patented Dec. 3, 1912.

Application filed October 31, 1908. Serial No. 460,480.

*To all whom it may concern:*

Be it known that I, CHARLES O. HASKELL, a citizen of the United States, residing at Los Angeles, in the county of Los Angeles and State of California, have invented new and useful Improvements in Electric Water-Heaters, of which the following is a specification.

This invention relates to an improved form of electric water heater in which the water is passed through a circuitous passage over and around the electric heating element and in which the latent heat of any steam generated is utilized for further heating the water.

The construction comprises a double shell case, the water being compelled to circulate between the shells in a thin layer and then in an opposite direction through the inner shell where the electric heating element is disposed. At the upper end of the inner shell a separating drum is arranged from which the heated water is drawn and also from which the generated steam escapes back into the cold water entering the heater. By allowing the steam to come into immediate contact with the cold water, its latent heat is utilized to heat that water and a saving is thus effected even with a very small amount of generated steam.

In the accompanying drawings, forming a part of this specification—Figure 1,— is a longitudinal vertical section of the heater. Fig. 2,— is a section taken on line 2—2 of Fig. 1.

In the drawings 5 designates the outer shell of the case, which is preferably cylindrical in form and provided at its upper end with a water inlet 6 which may be connected to any suitable supply. Near the upper end of the shell, and preferably formed integrally therewith, is a perforated diaphragm 7 through which the water must pass to reach the lower part of the shell and is thereby broken into a fine spray. In this form the water falls upon the upper closed end of inner shell 8, also preferably cylindrical, and concentrically arranged within shell 5 so as to leave an annular space 9 between the two shells. The water passes downwardly through annular space 9 to the bottom of shell 5 where it enters the inner shell through apertures 10 in its lower end. The water passes upwardly through shell 8 into drum 11 at its upper end whence it is drawn off through a discharge pipe 12 to any convenient point.

Situated within inner shell 8 is an electric heating element 13, formed upon a member 14 of insulating material of the configuration shown in Fig. 2. The edges of member 14 are provided with slots 15 through which resistance wire 16 is passed in its spiral winding around member 14. The ends of the resistance wire are connected to binding posts 17 which are in turn connected by wires 18 to binding posts 19 which project through shell 5 and to which the current feed wire may be connected on the outside of the case. A cap 20 closes the lower end of shell 5 and inner shell 8 rests at its lower end on this cap.

Water is admitted to the heater so that, when in operation, the water level is maintained at about the point shown in the drawings. The supply of water from inlet 6 keeps the level on the outside of inner shell 8 slightly higher than that inside and there is a consequent flow downwardly between the shells and upwardly within shell 8 and around the electric heating element. On its passage downwardly between the shells the water is somewhat heated as the whole heater, and especially the inner shell, is kept hot by the action of the heating element. On its passage upwardly within shell 8 the water is further heated, the final temperature depending on the speed at which the water passes through the heater. In raising the water to a high temperature it is impossible to avoid the generation of some steam and in the usual heater the latent heat required for the generation of this steam is lost, so far as the heating of water is concerned. Within drum 11 the steam is given an opportunity to separate from the water and a series of apertures 21 at the upper end of the drum and above the water line outside of shell 8 afford means for the escape of this steam into the spray delivered from diaphragm 7. The intimate contact of this steam with the spray immediately condenses the steam and heats the water in the spray thus adding greatly to the efficiency of the device. The placement of apertures 21 above the water line prevents the entrance of water to the drum and the discharge pipe without passing over the heating element.

One of the main sources of danger in electric water heaters has always resided in the fact that it is possible to turn the current through the heating element without having any water in the heater to keep the resistance wires from becoming excessively heated and melting. In the present form it will be seen that the water will all stand as high as the connection point of discharge pipe 12, the discharge pipe being made so as to prevent its siphoning any water from the heater. As illustrated in Fig. 1 the discharge pipe is enlarged in its vertical portion as at 22 so that the amount of water which passes through the small portion 23 of the discharge pipe cannot completely fill the large portion. This provision effectually prevents any siphoning action.

From the foregoing it will be seen that the above described heater is highly efficient in its action on account of its allowing a protracted contact of the water with the heated surface and also on account of utilizing any steam which may be generated. Heaters of this class are usually so arranged that as little steam as possible is generated but it is obvious that if the proportions are arranged to heat a large amount of water when a small amount of water is passed through the heater a great deal of steam will be generated. In view of this difficulty the utilization of the latent heat of the steam is most efficient for heating the water.

Having described my invention, what I claim as new and desire to secure by Letters Patent is:—

1. An electric water heater, comprising an outer and an inner shell, the inner shell being partially closed at the top to deflect the water and open at the bottom, inlet means for water at the top of the outer shell, and an electric heating element within the inner shell.

2. An electric heater, comprising an outer and an inner shell, the inner shell being closed at the top and open at the bottom, an electric heating element arranged within the inner shell, and means to spread the incoming water in a finely divided state to the upper end of the outer shell, the upper end of the inner shell being arranged for the discharge of water and steam.

3. An electric water heater, comprising two concentrically spaced shells, the inner shell being open at its lower end and provided with steam escape ports at its upper end, an electric heating element within the inner shell, means to introduce water to the upper end of the outer shell, and means to discharge water from the upper end of the inner shell.

4. An electric water heater comprising a plurality of spaced shells, an electric heating element within the inner shell, the inner shell being arranged to allow steam formed therein to escape into the outer shell, and means to circulate water successively through the spaces between the shells.

5. An electric water heater, comprising two concentrically spaced shells, the lower end of the inner shell being open and its upper end provided with steam escape ports, an electric heating element within the inner shell, means to introduce water in a fine spray to the upper end of the outer shell, and means to discharge the water from the upper end of the inner shell.

6. An electric water heater having a water jacket, said jacket having means for facilitating the introduction of water to said heater through said water jacket, and an electric heating element surrounded by said water jacket and adapted to receive water therefrom, means being arranged above said heating element for directing steam formed by said heating element into contact with the water entering said water heater.

In witness that I claim the foregoing I have hereunto subscribed my name this 20th day of October, 1908.

CHARLES O. HASKELL.

Witnesses:
EDMUND A. STRAUSE,
OLLIE PALMER.

Copies of this patent may be obtained for five cents each, by addressing the "Commissioner of Patents, Washington, D. C."